(12) United States Patent
Song et al.

(10) Patent No.: US 12,086,420 B2
(45) Date of Patent: Sep. 10, 2024

(54) MEMORY MANAGEMENT METHOD AND ELECTRONIC DEVICE

(71) Applicant: SAMSUNG ELECTRONICS CO., LTD., Suwon-si (KR)

(72) Inventors: Jiseop Song, Suwon-si (KR); Jiman Kwon, Suwon-si (KR); Hakryoul Kim, Suwon-si (KR); Jaehyeon Park, Suwon-si (KR); Jooyong Sin, Suwon-si (KR); Dongwook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/106,131

(22) Filed: Feb. 6, 2023

(65) Prior Publication Data

US 2023/0185458 A1 Jun. 15, 2023

Related U.S. Application Data

(63) Continuation of application No. PCT/KR2021/008712, filed on Jul. 8, 2021.

(30) Foreign Application Priority Data

Aug. 4, 2020 (KR) .................. 10-2020-0097160

(51) Int. Cl.
*G06F 12/00* (2006.01)
*G06F 3/06* (2006.01)

(52) U.S. Cl.
CPC .......... *G06F 3/0616* (2013.01); *G06F 3/0653* (2013.01); *G06F 3/0659* (2013.01); *G06F 3/0673* (2013.01)

(58) Field of Classification Search
CPC .... G06F 3/0616; G06F 3/0653; G06F 3/0659; G06F 3/0673; G06F 9/4401;
(Continued)

(56) References Cited

U.S. PATENT DOCUMENTS 6,782,469 B1 * 8/2004 Wilkerson ............ G06F 9/3824
712/216
10,394,655 B2   8/2019 Ding et al.
(Continued)

FOREIGN PATENT DOCUMENTS

JP   2011-233075 A   11/2011
JP   2016-207122 A   12/2016
(Continued)

OTHER PUBLICATIONS

Communication dated Oct. 13, 2021, issued by the International Searching Authority in counterpart International Application No. PCT/KR2021/008712 (PCT/ISA/210).
(Continued)

*Primary Examiner* — Shawn X Gu
*Assistant Examiner* — Mohammad S Hasan
(74) *Attorney, Agent, or Firm* — Sughrue Mion, PLLC

(57) ABSTRACT

An electronic device comprises: a memory management module; a processor operatively connected to the memory management module; and a memory controlled by the memory management module and operatively connected to the processor. The memory is configured to store instructions which, when executed, cause the processor to: execute at least one process, identify a rate at which the at least one process is terminated, based on a preconfigured first cycle, determine a number of times the identified rate exceeds a first threshold value, and based on a determination that the number of times the identified rate exceeds the first threshold value is greater than a second threshold value, reboot the electronic device.

20 Claims, 10 Drawing Sheets

(58) Field of Classification Search
CPC .... G06F 3/0481; G06F 3/0604; G06F 3/0631; G06F 3/0634; G06F 13/18
See application file for complete search history.

(56) References Cited

U.S. PATENT DOCUMENTS

| | | | |
|---|---|---|---|
| 10,432,801 B2 | 10/2019 | Aoki | |
| 11,132,219 B2 | 9/2021 | Chen et al. | |
| 2004/0064353 A1* | 4/2004 | Kim | G06Q 10/103 |
| | | | 705/301 |
| 2008/0008843 A1* | 1/2008 | Ratel | C23C 18/1233 |
| | | | 257/E21.271 |
| 2012/0131321 A1 | 5/2012 | Jitkoff et al. | |
| 2012/0174106 A1 | 7/2012 | Seo et al. | |
| 2013/0191701 A1 | 7/2013 | Mueller et al. | |
| 2014/0258521 A1* | 9/2014 | English | H04L 43/08 |
| | | | 709/224 |
| 2014/0325518 A1 | 10/2014 | Kim et al. | |
| 2015/0113539 A1* | 4/2015 | Agarwal | G06F 9/5088 |
| | | | 718/104 |
| 2016/0321139 A1 | 11/2016 | Kitamoto et al. | |
| 2016/0378536 A1* | 12/2016 | Kuribayashi | G06F 9/45558 |
| | | | 718/1 |
| 2019/0034222 A1 | 1/2019 | Choi | |
| 2019/0187899 A1 | 6/2019 | Yu et al. | |
| 2019/0220318 A1 | 7/2019 | Yang et al. | |
| 2019/0286475 A1 | 9/2019 | Mani | |
| 2020/0042371 A1 | 2/2020 | Park et al. | |
| 2020/0081741 A1 | 3/2020 | Mitsugi | |
| 2021/0303320 A1 | 9/2021 | Lee et al. | |
| 2021/0382757 A1* | 12/2021 | Azuma | G06F 9/505 |
| 2022/0367035 A1* | 11/2022 | Zhang | G16H 30/20 |

FOREIGN PATENT DOCUMENTS

| | | |
|---|---|---|
| JP | 6541930 B2 | 7/2019 |
| KR | 10-2008-0052339 A | 6/2008 |
| KR | 10-2012-0077265 A | 7/2012 |
| KR | 10-2013-0031888 A | 3/2013 |
| KR | 10-1300806 B1 | 8/2013 |
| KR | 10-2014-0127104 A | 11/2014 |
| KR | 10-2017-0090278 A | 8/2017 |
| KR | 10-2019-0018038 A | 2/2019 |
| KR | 10-2019-0046995 A | 5/2019 |
| KR | 10-2019-0073101 A | 6/2019 |
| KR | 10-2020-0012536 A | 2/2020 |
| KR | 10-2020-0015000 A | 2/2020 |

OTHER PUBLICATIONS

Communication dated Oct. 13, 2021, issued by the International Searching Authority in counterpart International Application No. PCT/KR2021/008712 (PCT/ISA/237).
Communication dated Jul. 8, 2024, issued by the Korean Patent Office in Korean Application No. 10-2020-0097160.

* cited by examiner

FIG. 7A

| WHETHER CRITICAL KILL OCCURS | INTERNET | GAME 1 | INTERNET | GAME 2 | CAMERA | GAME 1 | INTERNET | MMS | GAME 2 |
|---|---|---|---|---|---|---|---|---|---|
| | X | O | X | X | O | O | X | X | X |

REFERENCE VALUE BY RAM SIZE (50 / RAM GB Size)

| RAM Size (GB) | REFERENCE VALUE |
|---|---|
| 2 GB | 25% |
| 3 GB | 17% |
| 4 GB | 13% |
| 6 GB | 8% |
| 8 GB | 6% |
| 12 GB | 4% |
| 16 GB | 3% |

FIG. 8A

| WHETHER CRITICAL KILL OCCURS | INTERNET | GAME 1 | INTERNET [REPEATED] | GAME 2 | CAMERA | GAME 2 [REPEATED] | INTERNET [REPEATED] | MMS | GAME 2 [REPEATED] |
|---|---|---|---|---|---|---|---|---|---|
| | X | O | X | X | O | O | X | X | X |

DATA TABLE CHANGED IN PACKAGE UNIT

| PACKAGE ENTERED | WHETHER CRITICAL KILL OCCURS |
|---|---|
| INTERNET | X |
| GAME 1 | O |
| GAME 2 | X |
| CAMERA | O |
| MMS | X |

MEMORY MANAGEMENT METHOD AND ELECTRONIC DEVICE

CROSS-REFERENCE TO RELATED APPLICATIONS

This application is a by-pass continuation application of International Application No. PCT/KR2021/008712, filed on Jul. 8, 2021, which claims priority to Korean Patent Application No. 10-2020-0097160, filed on Aug. 4, 2020, in the Korean Intellectual Property Office, the disclosures of each of which are incorporated by reference herein in their entireties.

TECHNICAL FIELD

Various embodiments of the disclosure relate to a memory management method and an electronic device.

BACKGROUND ART

With the development of wireless communication technologies, an electronic device (e.g., an electronic device for communication or a smartphone) is commonly used in daily life. Therefore, the level of user demand for high performance of these devices continues to rise. In order to satisfy the high level of user demand, the electronic device performs many functions. Since the electronic device performs many functions within a limited memory capacity, a situation where the memory capacity is insufficient may occur, thereby reducing the usability of the electronic device.

For example, when the memory capacity is insufficient, the electronic device may terminate at least one application running in the background to secure the memory capacity. However, while the termination of a background application may result in a higher memory capacity, the functionality of the electronic device may reduce.

SUMMARY

An electronic device comprises: a memory management module; a processor operatively connected to the memory management module; and a memory controlled by the memory management module and operatively connected to the processor, where the memory is configured to store instructions which, when executed, cause the processor to: execute at least one process, identify a rate at which the at least one process is terminated, based on a preconfigured first cycle, determine a number of times the identified rate exceeds a first threshold value, and based on a determination that the number of times the identified rate exceeds the first threshold value is greater than a second threshold value, reboot the electronic device.

The processor is further configured to: identify a capacity of the memory, and configure the first threshold value based on the identified capacity of the memory, where a first capacity of the memory that is larger than a second capacity of the memory has a first reference value that is smaller than a second reference value associated with the second capacity.

The processor is configured to: identify a capacity of the memory, group the at least one process as a package based on the identified capacity of the memory, and based on a re-execution of the package, prevent the number of times of execution related to the re-execution from being included in a termination rate of the package.

The processor is further configured to: identify, based on the first cycle, the termination rate of the package, and reboot the electronic device based on a determination that the identified termination rate of the package exceeds a third threshold value, and where the third threshold value is about 50%.

The processor is further configured to: identify that the memory is insufficient based on a determination that the identified rate exceeds the first threshold value, identify, based on a determination the memory is insufficient, a priority of the at least one process allocated to the memory, select the at least one process based on the identified priority, and terminate the selected at least one process.

The processor is further configured to: based on the determination that the number of times the identified rate exceeds the first threshold value exceeds the second threshold value, reboot the electronic device to initialize the memory, and based on a determination that the number of times the identified rate exceeds the first threshold does not exceed the second threshold value, identify a rate at which the at least one process is terminated based on a second cycle.

The display module configured to display a user interface related to the rebooting, where the processor is further configured to: display a guide through the display module based on the determination the number of times the identified rate exceeds the first threshold value exceeds the second threshold value, and reboot the electronic device in response to a user input corresponding to the guide.

The processor is further configured to: identify a usage pattern stored in the memory, and reboot the electronic device based on the identified usage pattern.

The electronic device further comprises a communication module configured to communicate with a server, where the processor is further configured to: perform wireless communication with the server using the communication module, transmit, to the server, one or more of information related to the memory, log information, and time information, receive a reboot command from the server using the communication module, and reboot the electronic device in response to the reboot command.

A method performed in an electronic device, comprises: executing at least one process under control of a memory management module configured to manage a memory of the electronic device; identifying a rate at which the at least one process is terminated based on a preconfigured first cycle; determining a number of times the identified rate exceeds a first threshold value; and based on a determination that the number of times the identified rate exceeds the first threshold value is greater than a second threshold value, performing a rebooting of the electronic device.

The method further comprises: identifying a capacity of the memory of the electronic device, and configuring a first threshold value based on the capacity of the memory, where a first capacity of the memory that is larger than a second capacity of the memory has a first reference value that is smaller than a second reference value associated with the second capacity.

The method further comprises: identifying a capacity of the memory of the electronic device; grouping the at least one process as a package based on the identified memory capacity; based on a re-execution of the package, preventing the number of times of execution related to the re-execution from being included in a termination rate of the package.

The method further comprises: identifying, based on the first cycle, the termination rate of the package; and rebooting the electronic device based on a determination the identified termination rate of the package exceeds a third threshold value.

The method further comprises: identifying that the memory is insufficient based on a determination that the identified rate exceeds the first threshold value; identifying, based on a determination that the memory is insufficient, a priority of the at least one process allocated to the memory; selecting the at least one process based on the identified priority; and terminating the selected at least one process.

The performing of the rebooting comprises based on the determination the number of times the identified rate exceeds the first threshold value exceeds the second threshold value, rebooting the electronic device to initialize the memory.

The method further comprises: based on a determination that the number of times the identified rate exceeds the first threshold does not exceed the second threshold value, identify a rate at which the at least one process is terminated based on a second cycle.

The method further comprises: displaying a guide through a display module based on the determination the number of times the identified rate exceeds the first threshold value exceeds the second threshold value, and rebooting the electronic device in response to a user input corresponding to the guide.

The method further comprises: identifying a usage pattern stored in the memory; and rebooting the electronic device based on the identified usage pattern.

The usage pattern includes one or more of information regarding a program frequently used by a user, information regarding a program frequently used by the user, or information regarding a location of the electronic device.

The method further comprises: performing wireless communication with a server using a communication module, transmitting, to the server, one or more of information related to the memory, log information, and time information, receiving a reboot command from the server using the communication module; and rebooting the electronic device in response to the reboot command.

An aspect of various embodiments of the disclosure is to detect an out-of-memory situation and flexibly cope with the situation by applying a preconfigured solution in response to the detected out-of-memory situation.

According to various embodiments, the electronic device may collect situation information, time information, and information about a running application program in an out-of-memory situation, and may appropriately apply a solution based on the collected information. In addition, various effects identified directly or indirectly herein may be provided.

BRIEF DESCRIPTION OF DRAWINGS

In describing the drawings, identical or similar reference numerals may be used for identical or similar elements.

FIG. 7A is an exemplary diagram illustrating a method of detecting a process termination rate based on one cycle according to various embodiments of the disclosure.

FIG. 7B is a table to which a process termination rate is differently applied based on memory capacity according to various embodiments of the disclosure.

FIG. 8A is an exemplary diagram illustrating a method of detecting a rate at which a packaged process is terminated based on one cycle according to various embodiments of the disclosure.

FIG. 8B is a table for identifying whether a corresponding program is terminated based on a packaged process according to various embodiments of the disclosure.

DETAILED DESCRIPTION

Figure 1:
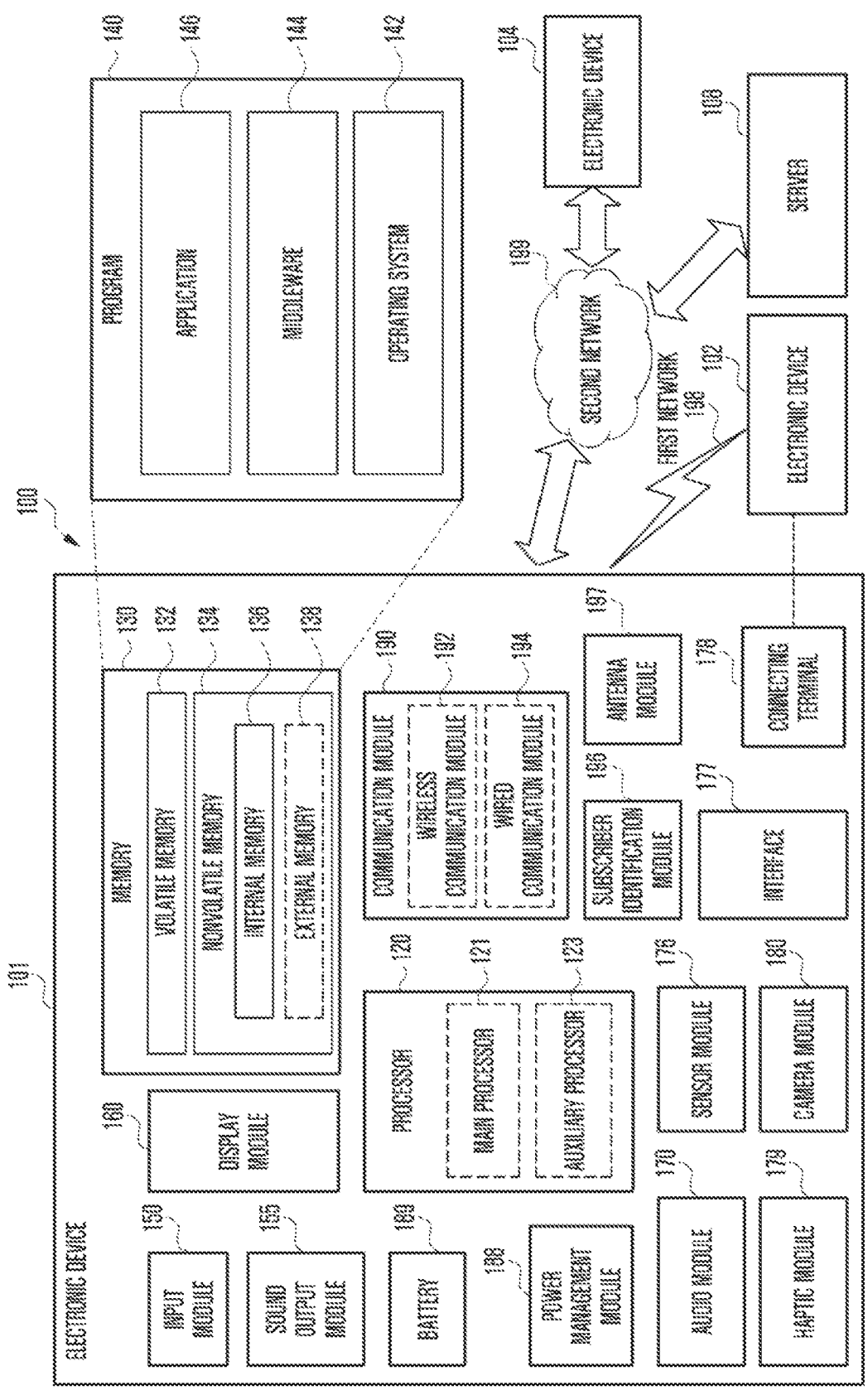
FIG. 1 is a block diagram of an electronic device in a network environment according to various embodiments of the disclosure.

FIG. 1 illustrates an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
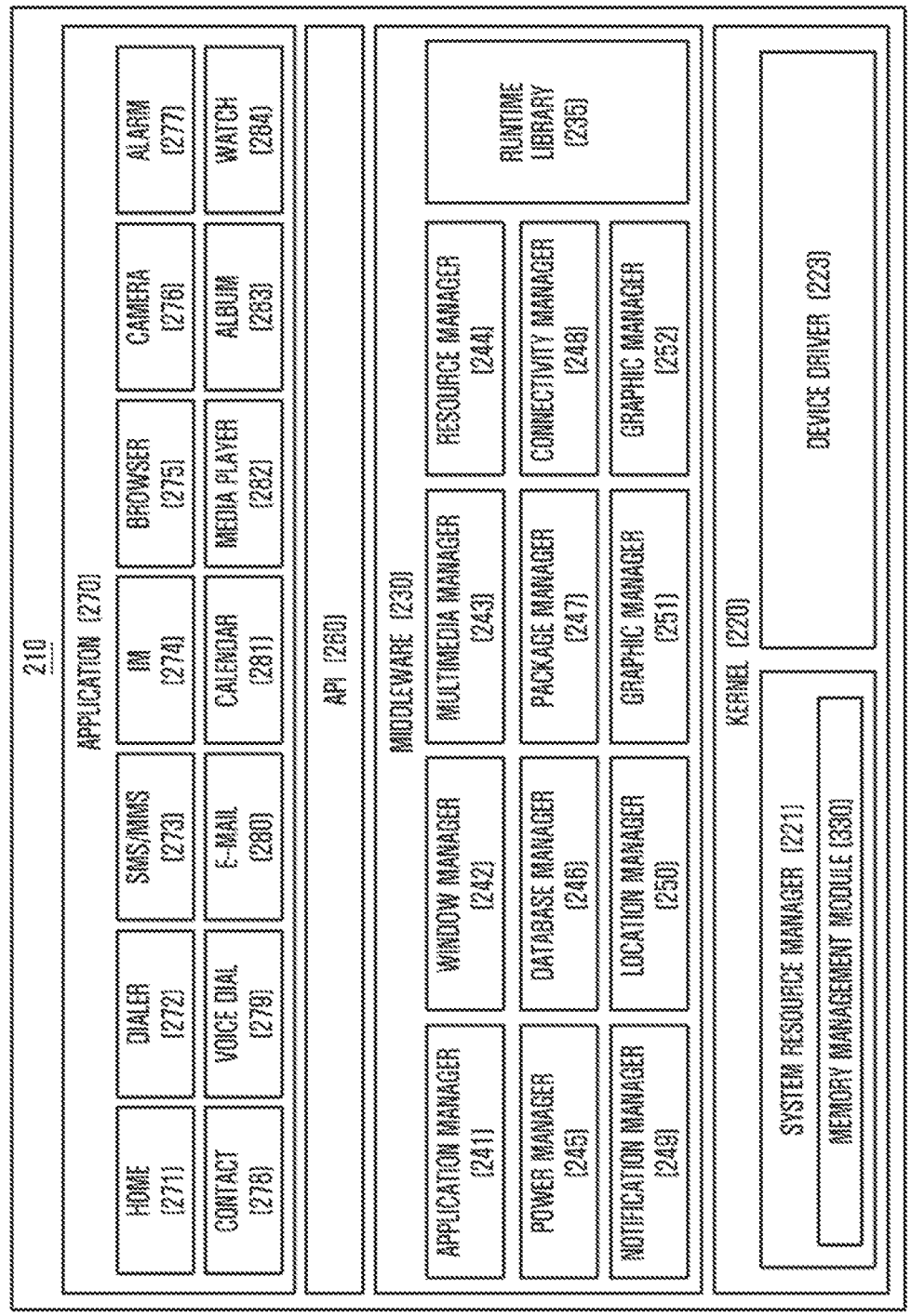
FIG. 2 is a block diagram of a program module according to various embodiments of the disclosure.

FIG. 2 is a block diagram of a program module, according to various embodiments of the disclosure.

According to one or more embodiments, a program module 210 (e.g., program 140 in FIG. 1) may include an operating system for controlling resources related to an electronic device (e.g., the electronic device 101 in FIG. 1) and/or various applications 270 (e.g., the application 146 in FIG. 1) running on the operating system. The operating system may include, for example, Android™, iOS™, Windows™, Symbian™, Tizen™, or Bada™, or any other operating system known to one of ordinary skill in the art. Referring to FIG. 2, the program module 210 may include a kernel 220, middleware 230 (e.g., the middleware 144 in FIG. 1), an API 260, and/or the applications 270 (e.g., the application 146 in FIG. 1). At least a part of the program module 210 may be preloaded on the electronic device 101, or may be downloaded from an external electronic device (e.g., the electronic devices 102 and 104 and/or the server 106).

According to one or more embodiments, the kernel 220 may include a system resource manager 221 and/or a device driver 223. The system resource manager 221 may control, allocate, or recover system resources. For example, the system resource manager 221 may include a process management unit, a memory management unit, and/or a file system management unit. According to one or more embodiments, the system resource manager 221 located in the kernel space may include a memory management module (e.g., a low memory killer demon (LMKD)) 330 for managing a memory (e.g., the memory 130 in FIG. 1). For example, the memory management module 330 may be defined as a memory management unit.

According to one or more embodiments, based on the capacity of the memory 130, the memory management module 330 may detect whether there is an out-of-memory situation. An out-of-memory situation may occur when the available memory capacity is zero or below a threshold. The memory management module 330 may determine whether to terminate at least one application program using the memory 130. For example, the memory management module 330 may determine whether to terminate at least one process residing in the memory 130 and related to the application program. The memory management module 330 may terminate at least one process allocated to the memory 130 in an out-of-memory situation, and may perform an operation for securing the memory 130. For example, when a situation in which available memory needs to be secured for the execution of a specific process occurs, the memory management module 330 may terminate at least one process currently residing in the memory 130. The memory management module 330 may terminate at least one process to secure available memory when a corresponding condition is satisfied based on a preconfigured condition.

According to one or more embodiments, the device driver 223 included in the kernel 220 may include, for example, a display driver, a camera driver, a Bluetooth driver, a shared memory driver, a USB driver, a keypad driver, a Wi-Fi driver, an audio driver, and/or an inter-process communication (IPC) driver.

According to one or more embodiments, the middleware 230 may provide, for example, a function commonly required by the applications 270, or may provide various functions to the applications 270 through the API 260 so that the applications 270 can use limited system resources inside the electronic device. According to one or more embodiments, the middleware 230 may include or more of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and/or a security manager 252.

According to one or more embodiments, the middleware 230 may include the runtime library 235. The runtime library 235 may include, for example, a library module that a compiler may use to add a new function through source code implemented in one or more programming languages while the applications 270 are running. The runtime library 235 may perform input/output management, memory management, or arithmetic function processing.

Referring to FIG. 2, the application manager 241 may manage the life cycle of the applications 270, for example. The window manager 242 may manage graphic user interface (GUI) resources used in a screen. The multimedia manager 243 may determine a format required for reproducing media files, and may encode or decode the media files by using a codec suitable for the format. The resource manager 244 may manage source codes of the applications 270 or a memory space. The power manager 245 may manage, for example, battery capacity or power, and may provide power information necessary for the operation of the electronic device. According to one or more embodiments, the power manager 245 may interoperate with a basic input/output system (BIOS). The database manager 246 may, for example, generate, retrieve, or change a database to be used in the applications 270. The package manager 247 may manage installation or update of applications distributed in the form of package files. The connectivity manager 248 may manage, for example, wireless and/or wired connections. The notification manager 249 may provide a user with, for example, an event such as an arrival message, an appointment, or a proximity notification. The location manager 250 may manage, for example, location information of the electronic device. The graphic manager 251 may manage, for example, a graphic effect to be provided to a user or a user interface related thereto. The security manager 252 may provide, for example, system security or user authentication. According to one or more embodiments, the middleware 230 may include a telephony manager for managing voice or video call functions of the electronic device, or a middleware module configured to form a combination of functions of the above-described elements.

According to one or more embodiments, the middleware 230 may provide a module specialized for each type of operating system. The middleware 230 may dynamically delete some existing elements from the operating system or add new elements to the operating system. The API 260 is, for example, a set of API programming functions, and may be provided in different configurations depending on operating systems. For example, in the case of Android or iOS, one API set may be provided for each platform, and in the case of Tizen, two or more API sets may be provided for each platform.

The applications 270 may include, for example, a home 271, a dialer 272, an SMS/MMS 273, an instant message (IM) 274, a browser 275, a camera 276, an alarm 277, contacts 278, a voice dial 279, an e-mail 280, a calendar 281, a media player 282, an album 283, a watch 284, health care (e.g., measurement of exercise quantity or blood sugar, etc.), and/or environmental information (e.g., atmospheric pressure, humidity, or temperature information) providing applications. According to one or more embodiments, the applications 270 may include an information exchange application configured to support information exchange between the electronic device 101 and the external electronic devices 102 and 104.

For example, the notification transmission application may transmit notification information generated by another application of the electronic device 101 to the external electronic devices 102 and 104, or may receive notification information from the external electronic devices 102 and 104 and provide the received notification information to the user.

According to one or more embodiments, at least a part of the program module 210 may be implemented (e.g., executed) in software, firmware, hardware, or a combination of at least two thereof, and may include a module, a program, a routine, a set of instructions, or a process for performing one or more functions.

Figure 3:
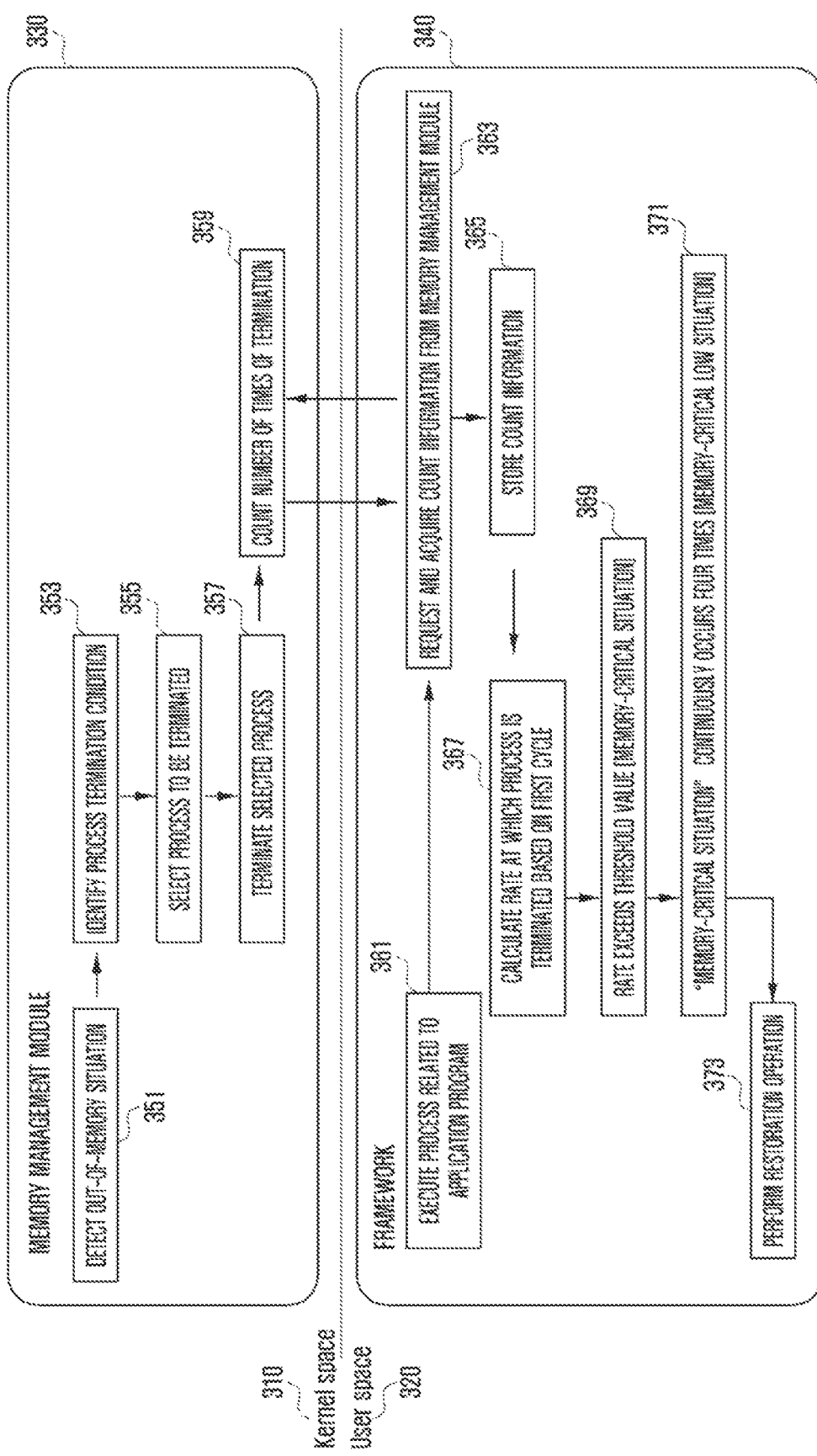
FIG. 3 is a block diagram illustrating a process of detecting an out-of-memory situation in a kernel space and a user space according to various embodiments of the disclosure.

FIG. 3 is a block diagram illustrating a process of detecting an out-of-memory situation in a kernel space 310 and a user space 320 according to various embodiments of the disclosure.

Referring to FIG. 3, the kernel space 310 and the user space 320 may be distinguished from each other on a memory address space in which the program module 210 is stored, and a process of detecting a situation in which memory (e.g., the memory 130 in FIG. 1) is insufficient in each area is illustrated. As an example, the memory address space may be partitioned such that the kernel space 310 and the user space 320 occupy different parts of the memory address space. According to one or more embodiments, the kernel space 310 may be defined as the kernel 220 included in the program module 210 in FIG. 2. According to one or more embodiments, the memory management module 330 (e.g., a low memory killer demon (LMKD)) (e.g., the memory management module 330 in FIG. 2) included in the kernel space 310 may be included in the system resource manager 221 in FIG. 2. According to one or more embodiments, the user space 320 may include an area at least partially controlled by a user. For example, the user space 320 may include a graphic user interface (GUI) and a framework 340, and may provide a specific function to a user. The user space 320 shows a process of executing an algorithm configured in order to secure the memory 130 in the electronic device 101 when a user executes an application program through the framework 340, according to one or more embodiments.

Referring to FIG. 3, in operation 351, the memory management module 330 may detect a situation where the memory 130 is insufficient to execute one or more processes associated with an application program. For example, when at least one application program is executed, at least one process related to the execution may be allocated to the memory 130, where the available memory required to executed the at least one process may be insufficient. The memory management module 330 may detect a situation where the memory 130 is insufficient, and may perform an operation for securing available memory.

According to one or more embodiments, the memory management module 330 may classify the out-of-memory level into a low level, a medium level, and/or a critical level, based on the capacity of the memory 130, and may configure different criteria for detecting out-of-memory situations. For example, the out-of-memory level may be configured to be a low level when a ratio of available memory to memory capacity is about 50%, may be configured to be a medium level when the ratio is about 70%, and may be configured to be a critical level when the ratio is about 90%. The memory management module 330 may detect an out-of-memory situation (e.g., a situation in which at least one process residing in the memory needs to be terminated) based on the memory capacity and the configured level. In one or more additional examples, the determination of an out-of-memory situation may be determined based on available memory capacity and the memory required to execute a process. For example, it may be determined that 5 KB of available memory may be required to execute the at least one process, but only 2 KB of memory, either contiguous or non-contiguous, is available. Therefore, in this situation, the available memory is insufficient.

In operation 353, the memory management module 330 may identify a condition for termination of a currently running process. For example, the memory management module 330 may identify whether the process has been terminated within about 100 ms or whether the current available memory is sufficient, and may determine whether the process termination condition is satisfied.

In operation 355, the memory management module 330 may select a process to be terminated from among the at least one process allocated to the memory 130. For example, a priority (e.g., a cached adj value) may be configured for the at least one process allocated to the memory 130, and a process to be terminated may be determined based on the priority. For example, the cached adj value indicating the priority of the at least one process may mean the order in which at least one process is terminated. The cached adj value may include a value determined based on at least one process. The memory management module 330 may configure a reference value corresponding to a memory level (e.g., a low level, a medium level, and/or a critical level), and may terminate the process when the priority of the process exceeds the reference value. For example, the priority (e.g., the cached adj value) of a process running in the foreground corresponds to "0", and the priority of a process with low importance, among processes running in the background, may be determined to be "900 to 999". For example, when the memory level is a medium level, and when the reference value is "850" or lower, the memory management module 330 may select at least one process corresponding to a priority exceeding "850", and may terminate the at least one selected process.

In operation 355, the memory management module 330 may select at least one process, based on the reference value of the memory level. In operation 357, the memory management module 330 may terminate the at least one selected process. The memory management module 330 may secure available memory by terminating the at least one process. According to one or more embodiments, in order to secure available memory, the memory management module 330 may terminate, based on the priority, at least one of the at least one process allocated to the memory 130.

In operation 359, the memory management module 330 may count the at least one terminated process. For example, the memory management module 330 may count the number of terminated processes based on the reference value of the memory level. For example, the memory management module 330 may count the number of processes terminated having a priority of "850" or lower when the reference value is "850", and may count the number of processes terminated having a priority of "700" or lower when the reference value is "700". The memory management module 330 may manage count information based on each reference value.

According to one or more embodiments, a processor (e.g., the processor 120 in FIG. 1) of the electronic device 101 may identify the capacity and/or available capacity of a memory (e.g., the memory 130 in FIG. 1, or a DRAM main memory) at boot time, and may determine a first threshold value (e.g., the reference value) based on the identified capacity and/or available capacity of the memory 130. For example, the processor 120 may identify the capacity and/or available capacity of a memory in a code generation step (e.g., an initialization step) of the framework 340 and may configure the first threshold value. The electronic device 101 may count, based on the first threshold value, a situation in which the at least one process allocated to the memory 130 is terminated.

Referring to FIG. 3, in operation 361, the electronic device 101 may execute at least one process related to an application program through the framework 340. For example, the electronic device 101 may execute an application process corresponding to at least one application program in response to a user input. According to one or more embodiments, the electronic device 101 may detect an out-of-memory situation when the at least one application process is executed. For example, when the at least one process related to an application program is executed in operation 361 in FIG. 3, an out-of-memory situation may be detected in operation 351.

In operation 363, the electronic device 101 may request count information (e.g., the number of times a process was terminated due to out-of-memory situations or the number of times a process was terminated according to the adj value of the process) from the memory management module 330 through the framework 340, and may acquire the count information from the memory management module 330. The memory management module 330 may transmit, to the framework 340, count information recorded based on the reference value in operation 359. According to one or more embodiments, the electronic device 101 may not directly refer to the count information managed by the memory management module 330, and may require and acquire the count information from the memory management module 330. According to one or more embodiments, the electronic device 101 may request count information, based on a reference value of a memory level and acquire the count information. For example, the memory management module 330 may terminate at least one process exceeding the reference value, and may record count information corresponding to an adj value (e.g., a cached adj value) corresponding to the at least one process. The memory management module 330 may provide count information recorded for each adj value in response to a request for the count information.

In operation 365, the electronic device 101 may store the count information acquired from the memory management module 330 in the memory 130. According to one or more embodiments, when at least one application process is executed, the electronic device 101 may continuously acquire count information, and may compare the continuously acquired count information with the previously acquired count information and analyze the continuously acquired count information. For example, when at least one process residing in the memory 130 is terminated by the execution of the at least one application process, the electronic device 101 may increase the acquired count information by 1. For example, the electronic device 101 may terminate at least one process having an adj value of "700" among the at least one process residing in the memory 130, and may increase count information corresponding to the adj value of "700" by 1. Even when multiple processes having an adj value of "700" are terminated, count information corresponding to the adj value of "700" may be increased by 1.

In operation 367, the electronic device 101 may calculate a rate at which the at least one process is terminated based on one cycle (e.g., a first cycle). For example, a cycle in which an application program is executed 50 times may be determined as one cycle. The rate at which the at least one process is terminated may be defined as a rate which the number of times the process is terminated based on one cycle. According to one or more embodiments, the electronic device 101 may calculate, based on the count information, a rate at which a process is terminated for one cycle.

In operation 369, the electronic device 101 may identify whether the calculated rate exceeds a threshold value. According to one or more embodiments, a situation in which a process termination rate exceeds the threshold value may be defined as a memory-critical situation. According to one or more embodiments, the threshold value may be determined based on memory capacity. For example, the threshold value may decrease as the memory capacity increases. According to one or more embodiments, the electronic device 101 equipped with a small-capacity memory may frequently encounter an out-of-memory situation, and when the situation frequently occurs, a memory-critical situation may occur.

In operation 371, the electronic device 101 (e.g., the processor 120 in FIG. 1) may identify whether the memory-critical situation in operation 369 has occurred four or more times in succession. For example, when a memory-critical situation occurs, the processor 120 may transfer information about the occurrence to a memory management program (e.g., a healthcare application program), and may count, through the memory management program, the number of times the memory-critical situation occurs. According to one or more embodiments, the situation in which the memory-critical situation occurs four times in succession may be defined as a memory-critical low situation. The detection of the occurrence of this situation may be based on the memory-critical situation occurring four time in succession within a predetermined time period. According to one or more embodiments, the memory-critical low situation may be a situation in which it is difficult to secure usable memory, and may be a situation in which an out-of-memory problem continuously occurs. According to one or more embodiments, when a memory-critical low situation occurs, the processor 120 may reboot the electronic device 101 or initialize the memory 130 to guide a user to a solution for securing usable memory.

In operation 373, the processor 120 may perform a restoration operation (e.g., rebooting of the electronic device 101 or displaying a user interface for the restoration operation) in response to the occurrence of the memory-critical low situation. For example, the processor 120 may reboot the electronic device 101 through a restoration program (e.g., a restoration application program), or may provide a user interface, thereby configuring a reboot time point. For example, the restoration program may display a user interface that guides a restoration operation, and may provide various options such as "reboot immediately," "reboot late at night," and "reboot time setting." According to one or more embodiments, when a memory-critical low situation occurs, the electronic device 101 may display a guide for performing a configured solution (e.g., a restoration operation) on a screen, and may determine whether to perform the solution in response to a user's selection.

An electronic device 101, according to various embodiments, may include a memory management module 330, a processor 120 operatively connected to the memory management module 330, and a memory 130 controlled by the memory management module 303 and operatively connected to the processor 120. The memory 130 may store instructions which, when executed, cause the processor 120 to execute at least one process, identify a rate at which the at least one process is terminated based on a preconfigured first cycle, detect a situation in which the identified rate exceeds a first threshold value, and reboot the electronic device 101 when the detected situation continuously occurs so that a second threshold value is exceeded.

According to one or more embodiments, the processor 120 may identify the capacity of the memory 130 and may configure the first threshold value based on the identified capacity of the memory 130.

According to one or more embodiments, the processor 120 may identify the capacity of the memory 130, may group the at least one process as a package based on the identified capacity of the memory 130, and when the package is re-executed, the number of times of execution related to the re-execution in a rate at which the package is terminated may not be reflected. For example, at least one process executed in response to execution of a specific application program may be grouped as one package. According to one or more embodiments, the package may be defined as a package managed by the package manager 247 in FIG. 2.

According to one or more embodiments, the processor 120 may identify, based on the first cycle, a termination rate based on the package, and may reboot the electronic device when the identified termination rate based on the package exceeds a third threshold value.

According to one or more embodiments, the third threshold value may be about 50% (e.g., between 48%-52%).

According to one or more embodiments, the processor 120 may identify that the memory 130 is insufficient when the identified rate exceeds the first threshold value, and may terminate the at least one process allocated to the memory 130.

According to one or more embodiments, the processor 120 may identify a priority of the at least one process allocated to the memory 130, may select the at least one process based on the identified priority, and may terminate the selected at least one process based on the identified priority. For example, processes with a higher priority are less likely to be terminated, especially when another process of lower priority is simultaneously being executed with the process having the higher priority.

According to one or more embodiments, when the situation in which the identified rate exceeds the first threshold value continuously occurs so that the second threshold value is exceeded, the processor 120 may determine that a problem of the out-of-memory situation continuously occurs in the memory 130, and may reboot the electronic device to initialize the memory 130.

According to one or more embodiments, when the situation in which the identified rate exceeds the first threshold value does not continuously occur, the processor 120 may identify a rate at which the at least one process is terminated, based on a second cycle.

According to one or more embodiments, the electronic device 101 may further include a display module 160 for displaying a user interface related to the rebooting, where, the processor 120 may display a guide through the display module 160 when the detected situation occurs a number of times exceeding the second threshold value, and may reboot the electronic device in response to a user input corresponding to the guide.

According to one or more embodiments, the processor 120 may identify a usage pattern stored in the memory 130, and may reboot the electronic device 101 based on the identified usage pattern.

According to one or more embodiments, the electronic device 101 may further include a communication module 190 configured to communicate with a server 108, where the processor 120 may perform wireless communication with the server 108 by using the communication module 190, and may transmit, to the server 108, one or more of information related to the memory 130, log information, and time information.

According to one more embodiments, the processor 120 may receive a reboot command from the server by using the communication module, and may reboot the electronic device in response to the reboot command.

Figure 4:
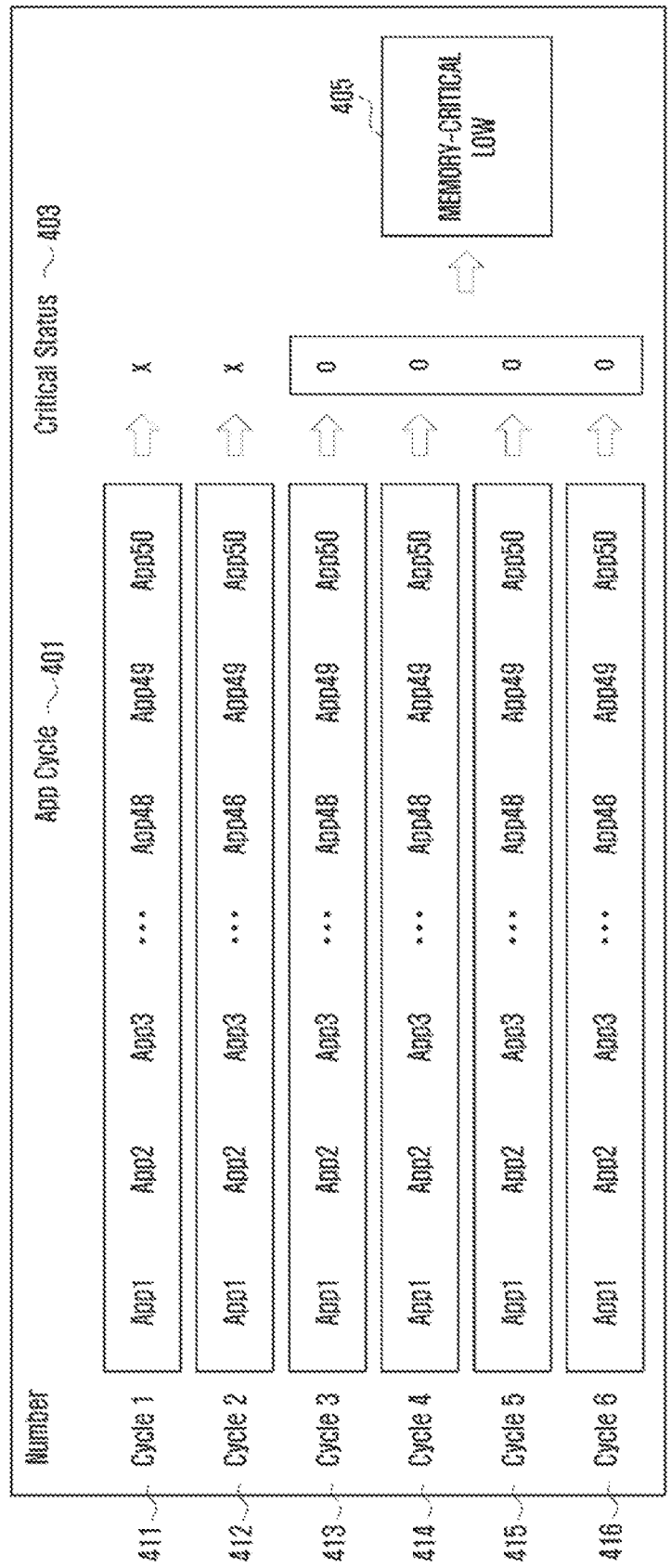
FIG. 4 is an exemplary diagram illustrating a process of detecting an out-of-memory situation based on one cycle according to various embodiments of the disclosure.

FIG. 4 is an exemplary diagram illustrating a process of detecting an out-of-memory situation based on one cycle, according to various embodiments of the disclosure.

Referring to FIG. 4, an electronic device (e.g., the electronic device 101 in FIG. 1) may configure a cycle in which an application program is executed 50 times as one cycle 401. The electronic device 101 may identify at least one process executed in relation to an application program that is executed based on a first cycle 411. According to one or more embodiments, the electronic device 101 may identify a rate which the number of times a process is terminated (e.g., the number of times a process is terminated due to not enough memory) based on the first cycle 411, and when the identified rate exceeds a first threshold value, may determine that a memory-critical situation 403 has occurred. According to one or more embodiments, the electronic device 101 may subsequently perform a second cycle 412 when the first cycle 411 is completed, and may subsequently perform a third cycle 413 when the second cycle 412 is completed. The electronic device 101 may identify whether an out-of-memory situation (e.g., the memory-critical situation 403) has occurred based on the one cycle 401. Referring to FIG. 4, it may be identified that the memory-critical situation 403 has not occurred in a first cycle section 411 and a second cycle section 412, and that the memory-critical situation 403 has occurred in a third cycle section 413 to a sixth cycle section 416.

According to one or more embodiments, the electronic device 101 may identify a rate of the number of times of termination of at least one process based on the one cycle 401 (e.g., the application program is executed 50 times), and, when the rate exceeds the first threshold value, may determine that the memory-critical situation 403 has occurred. According to one or more embodiments, when the memory-critical situation 403 continuously occurs at a second threshold value (e.g., four times) or more, the electronic device 101 may determine that a memory-critical low situation 405 has occurred. For example, the memory-critical low situation 405 may be a situation in which memory is continuously insufficient even when at least one process is terminated. According to one or more embodiments, the electronic device 101 may reboot the electronic device 101 in response to the memory-critical low situation 405. According to one or more embodiments, the electronic device 101 may display a guide for rebooting on a display module (e.g., the display module 160 in FIG. 1) in response to the memory-critical low situation 405, and may reboot the electronic device 101 in response to a user's selection of the guide.

According to one or more embodiments, the first threshold value may be defined as a reference value for determining whether the memory-critical situation 403 has occurred. According to one or more embodiments, the first threshold value may be determined based on memory capacity. For example, the first threshold value may include a value obtained by dividing 50 by the memory capacity (e.g., 2 GB, 4 GB, and/or 8 GB). When the memory capacity of the electronic device 101 is 2 GB, the threshold value may be determined to be about 25%, and when the memory capacity is 8 GB, the threshold value may be determined to be about 12.5%. According to one or more embodiments, in the case of an electronic device having small memory capacity, the probability that a process allocated to the memory 130 is terminated may be higher than that of an electronic device having relatively large memory capacity, and the reference value for determining that the memory-critical situation 403 has occurred may be high. Conversely, since the electronic device having large memory capacity has a lot of usable space even when a memory leak problem occurs, the probability that a process allocated to the memory 130 is terminated may be relatively low. In one or more example, a memory leak may occur when memory allocation is incorrectly managed such that memory which is no longer needed is not released. In the electronic device having large memory capacity, a user may experience inconvenience even when a process is temporarily terminated, and thus, the reference value for determining that the memory-critical situation 403 has occurred may be low.

According to one or more embodiments, the electronic device 101 equipped with a low-capacity (e.g., about 4 GB or less) memory may additionally configure at least one process in a package unit, and may identify the rate of termination in the package unit within the memory 130. According to one or more embodiments, the low-capacity electronic device 101 may determine that the memory-critical situation 403 occurs when the rate of termination in the package unit within the memory 130 exceeds about 50%. For example, the low-capacity electronic device 101 may identify a rate which a situation in which at least one process is terminated based on one cycle, and may identify whether the rate exceeds the first threshold value. When the rate exceeds the first threshold value, the low-capacity electronic device 101 may additionally group the process as a package unit (e.g., classify one application program as one package), and may identify whether the rate of termination in the package unit within the memory 130 exceeds about 50%. For example, when a first application program is repeatedly executed based on one cycle while the first application program is grouped as a package unit, the number of times of repeated execution may not be counted. When the first application program is a high-specification required program and is repeatedly executed, multiple processes may be temporarily terminated, and thus, the memory-critical situation 403 may be detected. According to one or more embodiments, the low-capacity electronic device 101 may group at least one process as a package unit, thereby preventing the memory-critical situation 403 from occurring. The low-capacity electronic device 101 may determine that the memory-critical situation 403 has occurred when the rate of termination in the package unit exceeds 50%.

According to one or more embodiments, the reason why by the low-capacity electronic device 101 additionally identifies the termination rate in the package unit is that when a specific application program such as a high-specification required game is executed, a situation in which multiple processes are temporarily terminated may occur, and an error may occur in detecting the memory-critical situation 403 by relying only by the process termination rate. According to one or more embodiments, the low-capacity electronic device 101 may additionally compare and analyze termination rates in package units within the memory to identify the memory-critical situation 403. For example, the low-capacity electronic device 101 may re-identify the memory-critical situation 403 in package units, thereby preventing an erroneous identification of the memory-critical situation 403, which has temporarily occurred.

Figure 5:
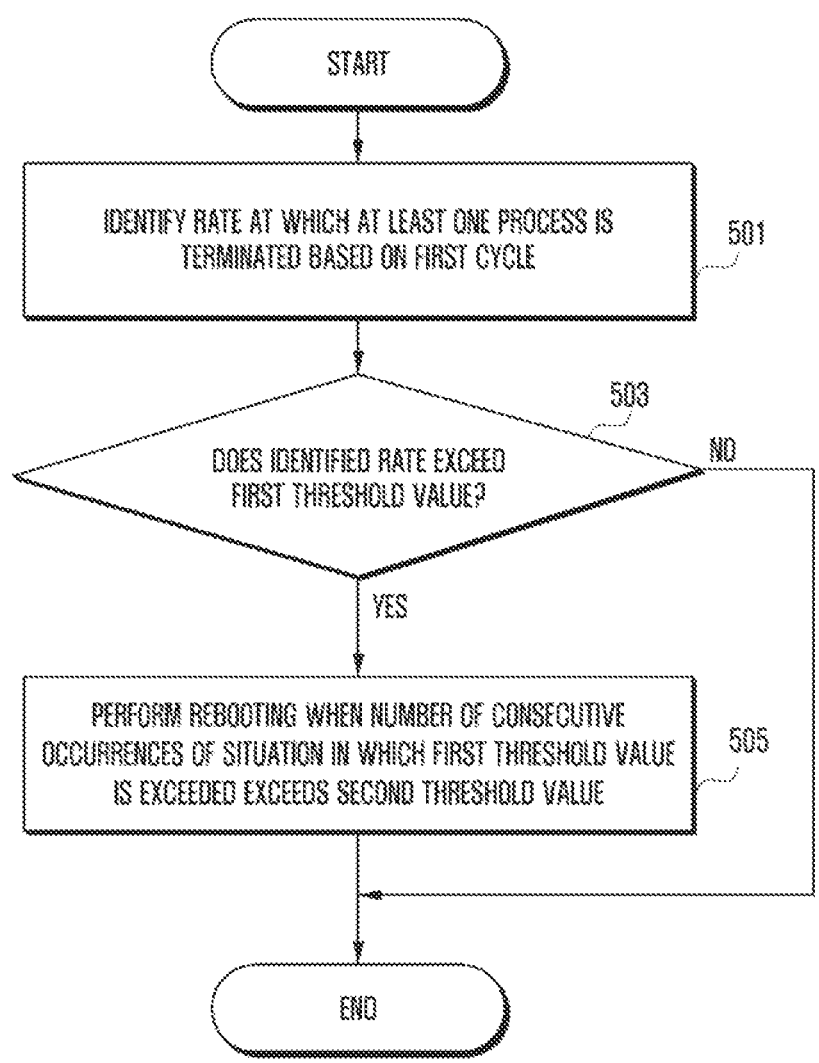
FIG. 5 is a flowchart illustrating a memory management method according to an out-of-memory situation according to various embodiments of the disclosure.

FIG. 5 is a flowchart illustrating a memory management method according to an out-of-memory situation, according to various embodiments of the disclosure.

According to one or more embodiments, an electronic device (e.g., the electronic device 101 in FIG. 1) may configure a cycle in which at least one application program is executed 50 times as one cycle, and may identify whether an out-of-memory situation (e.g., a memory-critical situation) has occurred, based on the one cycle. According to one or more embodiments, the electronic device 101 may identify a rate at which at least one process of the at least one application program allocated to a memory (e.g., the memory 130 in FIG. 1) is terminated, based on one cycle, and when the rate exceeds a configured first threshold value, may determine that an out-of-memory situation has occurred. The electronic device 101 may perform a rebooting operation when the out-of-memory situation continuously occurs during a cycle of a second threshold value (e.g., four times).

In operation 501, a processor (e.g., the processor 120 in FIG. 1) of the electronic device 101 may identify a rate at which at least one process allocated to the memory 130 is terminated, based on a first cycle. For example, the first cycle may be defined as a cycle in which a program (e.g., an application program) is executed 50 times in the electronic device 101. When at least one process is terminated 30 times during the first cycle, the processor 120 may calculate the rate as 60%. When at least one process is terminated 10 times during the first cycle, the processor 120 may calculate the rate as 20%. According to one or more embodiments, the processor 120 may calculate a rate at which at least one process allocated to a memory (e.g., the memory 130 in FIG. 1) is terminated during one cycle (e.g., the first cycle) in which a program is executed 50 times.

In operation 503, the processor 120 may determine whether the identified rate exceeds the first threshold value. According to one or more embodiments, the first threshold value may be defined as a reference value for determining that an out-of-memory situation has occurred, and may be determined based on the capacity of the memory. For example, the first threshold value may be configured to decrease as the capacity of the memory increases. The fact that the memory capacity is large may be interpreted as implying that an out-of-memory situation does not occur often, and in order to determine that an out-of-memory situation has occurred, the first threshold value may be configured to be low.

In operation 505, the processor 120 may reboot the electronic device 101 when a situation in which the identified rate exceeds the first threshold value continuously occurs in which that the second threshold value is exceeded. For example, a situation in which the identified rate exceeds the first threshold value in a first cycle may be referred to as a memory-critical situation. The second threshold value may be a reference value for determining the number of times the memory-critical situation has continuously occurred (e.g., a number of times the memory-critical situation has occurred in the same cycle). According to one or more embodiments, the second threshold value may be about four times, and a situation in which the memory-critical situation continuously occurs for four cycles may be referred to as a memory-critical low situation. When the memory-critical situation occurs continuously for four cycles (when the memory-critical low situation occurs), the processor 120 may determine that the out-of-memory situation is not solved and a memory problem continues to occur. The processor 120 may perform a rebooting operation to solve the out-of-memory situation.

Figure 6:
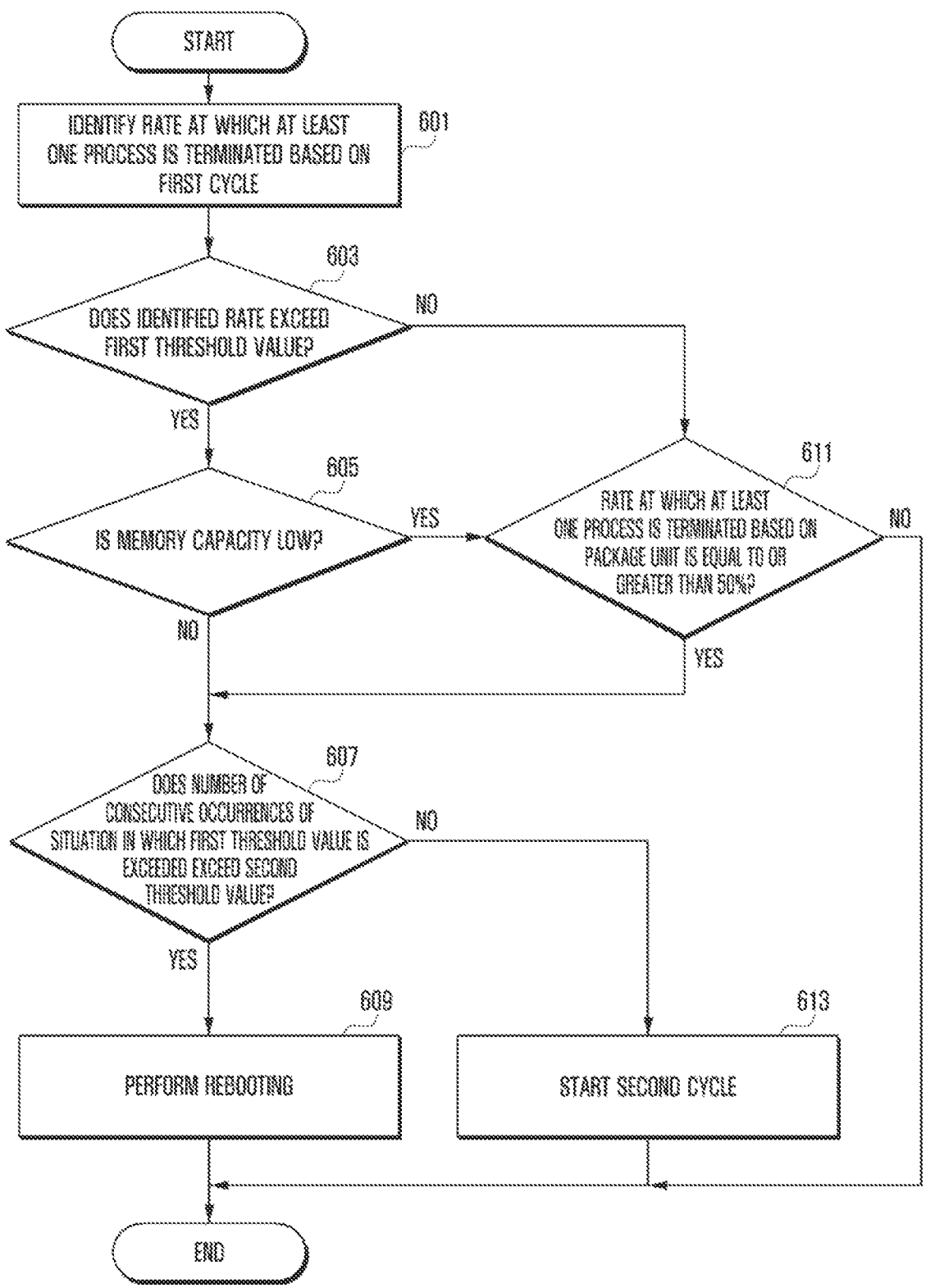
FIG. 6 is a flowchart illustrating a method of managing memory in consideration of memory capacity according to various embodiments of the disclosure.

FIG. 6 is a flowchart illustrating a method of managing memory in consideration of memory capacity, according to various embodiments of the disclosure.

Operations 601 to 603 in FIG. 6 may be the same as operations 501 to 503 in FIG. 5. Compared to FIG. 5, the flowchart in FIG. 6 illustrates another process for determining whether the memory capacity is low (e.g., 4 GB or less) and performing one or more additional operations when the memory capacity is low.

In operation 601, a processor (e.g., the processor 120 in FIG. 1) of the electronic device 101 may identify a rate at which at least one process is terminated, based on a first cycle. For example, the first cycle may be defined as a cycle in which a program (e.g., an application program) is executed 50 times in the electronic device 101.

In operation 603, the processor 120 may determine whether the identified rate exceeds a first threshold value. According to one or more embodiments, the first threshold value may be defined as a reference value for determining that there is an out-of-memory situation, and may be determined based on memory capacity For example, the first threshold value may be configured to decrease as the memory capacity increases. According to one or more embodiments, a situation in which the identified rate exceeds the first threshold value may be referred to as a memory-critical situation.

When the identified rate exceeds the first threshold value in operation 603, the processor 120 may determine, in operation 605, whether the memory capacity is low. For example, an electronic device having low-capacity memory may include an electronic device having memory capacity of about 4 GB or less. When a specific application program is executed, the electronic device 101 with a low memory capacity may experience an out-of-memory situation (e.g., a memory-critical situation) more often than an electronic device with a high memory capacity. According to one or more embodiments, the electronic device 101 equipped with a low-capacity memory may additionally group at least one process allocated to the memory as a package, and identify a termination rate based on the package.

When the memory capacity is determined not to be low in operation 605, the processor 120 may identify, in operation 607, whether the number of times a situation in which the identified rate exceeds the first threshold value continuously occurs (e.g., the number of times a memory-critical situation occurs) exceeds a second threshold value (e.g., four times). For example, the processor 120 may identify whether a memory-critical situation based on one cycle continuously occurs four or more times. When the memory-critical situation continuously occurs for four cycles, the processor 120 may determine that an out-of-memory situation is not solved. According to one or more embodiments, the second threshold value may be four times, and the situation in which the memory-critical situation continuously occurs for four cycles may be referred to as a memory-critical low situation.

According to one or more embodiments, when a memory-critical low situation occurs, the processor 120 may transmit log information of the electronic device 101 to a server (e.g., the server 108 in FIG. 1), and the server 108 may store the log information in a memory. For example, the server 108 may collect log information corresponding to a memory-critical low situation, and may provide a solution corresponding to the memory-critical low situation to the electronic device 101.

In operation 609, the processor 120 may perform rebooting when a memory-critical low situation continuously occurs (e.g., a situation in which a memory-critical situation continuously occurs four times). According to one or more embodiments, the processor 120 may perform a system initialization operation when an out-of-memory problem continuously occurs. According to one or more embodiments, before rebooting, the processor 120 may store occurrence information and time information of a memory-critical situation based on the first cycle as log information in the memory 130. According to one or more embodiments, the processor 120 may use the log information stored in the memory 130 to identify a problem related to the memory 130.

When the memory capacity is determined to be low in operation 605, the processor 120 may identify, in operation 611, whether the rate at which at least one process is terminated based on a package unit (e.g., one application program is classified as one package) is equal to or higher than a half (e.g., about 50%) of the number of times of execution of the at least one process. For example, the processor 120 may group a first application program as a first group, and even when the first application program is repeatedly executed based on one cycle, may not count the number of times the first application program is repeatedly executed. For example, when the first application program, which may be a high-specification required program, is repeatedly executed, the electronic device 101 having a low memory capacity may temporarily terminate multiple processes allocated to the memory 130, and a memory-critical situation may occur. According to one or more embodiments, in order to prevent a memory-critical situation from occurring due to the execution of a high-specification required specific program, the processor 120 may group and manage at least one process allocated to the memory 130 as a package. In operation 611, the processor 120 may identify whether the termination rate of the packaged at least one process is equal to or greater than half of the number of times of execution of the at least one process. When the termination rate is equal to or greater than half of the number of times of execution of the at least one process in operation 611, the processor 120 may move to operation 607.

When the memory-critical low situation (e.g., the situation in which the memory-critical situation continuously occurs four times) does not occur in operation 607, the processor 120 may identify at least one process allocated to the memory 130, based on a second cycle in operation 613. According to one or more embodiments, before starting the second cycle, the processor 120 may store, in the memory 130, information related to the memory-critical situation based on the first cycle and time information as log information of the electronic device 101.

According to one or more embodiments, the electronic device 101 may compare and analyze the number of times the memory-critical situation and the memory-critical low situation have occurred for the last 25 cycles. The electronic device 101 may transmit the compared and analyzed information and the log information stored in the memory 130 to the server 108. According to one or more embodiments, the server 108 may analyze a occurrence of a memory problem according to the type of the electronic device 101. The server 108 may analyze the cause of the memory problem, based on the time the memory problem occurred. The server 108 may periodically analyze a memory-critical situation and a memory-critical low situation occurring in the electronic device 101, and may produce a solution to solve the memory problem. For example, the solution may display a user interface indicating guide information according to an out-of-memory situation on a screen, and may be used to minimize the out-of-memory situation by providing a notification to a user. According to one or more embodiments, the server 108 may provide at least one solution based on the model (e.g., kind and/or type) of the electronic device 101. The server 108 may identify a usage pattern of the electronic device 101 to design and produce the solution so that the solution can be applied at dawn time when the use of the electronic device 101 is relatively low. For example, the usage pattern may include information regarding when the electronic device 101 is used by the user, information regarding a program frequently used by the user, and/or information regarding the location of the electronic device 101 for each time zone.

FIG. 7A is an exemplary diagram illustrating a method of detecting a process termination rate based on one cycle, according to various embodiments of the disclosure. FIG. 7B is a table in which a process termination rate is differently applied based on memory capacity, according to various embodiments of the disclosure.

Referring to FIG. 7A, a processor (e.g., the processor 120 in FIG. 1) of an electronic device (e.g., the electronic device 101 in FIG. 1) may identify whether at least one process allocated to a memory (e.g., the memory 130 in FIG. 1) is terminated when at least one program is executed based on one cycle. A situation in which at least one process is terminated may be referred to as a critical kill. For example, the processor 120 may identify that no critical kill occurs when an "Internet program" is executed. The processor 120 may identify that a critical kill has occurred when a "game 1 program" has been executed. According to one or more embodiments, the electronic device 101 may calculate a rate at which a critical kill occurs based on one cycle (e.g., a cycle in which at least one application program is executed 50 times). Referring to FIG. 7A, the processor 120 may identify that a critical kill occurred three times while programs were executed a total of nine times, and may calculate that the process termination rate is about 33%. FIG. 7A illustrates a situation in which programs are executed nine times, but the disclosure is not limited thereto. According to one or more embodiments, the electronic device 101 may identify a rate at which at least one process is terminated for a cycle in which an application program is executed 50 times (e.g., a first cycle). According to one or more embodiments, the electronic device 101 may compare a rate, at which at least one process allocated to the memory 130 is terminated based on one cycle, with a configured threshold value, and may determine whether a situation where the memory 130 is insufficient (e.g., a memory-critical situation) has occurred.

Referring to FIG. 7B, in the electronic device 101, the first threshold value (e.g., a reference value, or a reference value for determining that a memory-critical situation has occurred) may be differently configured depending on the capacity of the memory 130. For example, the electronic device 101 may identify the capacity of the memory 130 through a framework (e.g., the framework 330 in FIG. 3) at boot time, and may determine the first threshold value based on the identified capacity of the memory 130. According to one or more embodiments, in the electronic device 101 having a low capacity of the memory 130, the first threshold value may be configured relatively high, and in the electronic device 101 having a high capacity of the memory 130, the first threshold value may be configured relatively low. For example, the first threshold value may be determined to be a value resulting from dividing 50 by the memory capacity (e.g., 2 GB, 4 GB, and/or 8 GB). According to one or more embodiments, an electronic device with a small memory capacity may have a higher process termination probability than an electronic device with a relatively large memory capacity, and may have a high reference value for determining that a memory-critical situation has occurred. Conversely, since an electronic device with a high memory capacity has a lot of usable space even when a memory leak problem occurs, the processor termination probability may be relatively low. In an electronic device with a high memory capacity, a user may be inconvenienced even when a process is temporarily terminated, and thus, a reference value for determining that a memory-critical situation has occurred may be low.

FIG. 8A is an exemplary diagram illustrating a method of detecting a rate at which a packaged process is terminated based on one cycle, according to various embodiments of the disclosure. FIG. 8B is a table for identifying whether a corresponding program is terminated based on a packaged process according to various embodiments of the disclosure.

Referring to FIG. 8A, a processor (e.g., the processor 120 in FIG. 1) of an electronic device (e.g., the electronic device 101 in FIG. 1) may identify whether at least one process allocated to a memory (e.g., the memory 130 in FIG. 1) is terminated when at least one program is executed based on one cycle. A situation in which at least one process is terminated may be referred to as a critical kill. According to one or more embodiments, the processor 120 may group at least one process as a package and may reflect the same in the number of times the at least one process is terminated. For example, at least one process executed in response to execution of a specific application program may be grouped as one package. According to one or more embodiments, the package may be defined as a package managed by the package manager 247 in FIG. 2. According to one or more embodiments, the electronic device 101 having a low memory capacity may group at least one process as a package, and may determine whether a memory-critical situation occurs, based on the termination rate of a packaged process. According to one or more embodiments, when the electronic device 101 equipped with a low-capacity memory executes a high-specification required process, multiple processes allocated to the memory may be terminated, and a memory-critical situation may occur. The electronic device 101 may group and manage at least one process allocated to the memory 130 as a package in order to prevent the memory-critical situation from occurring due to the execution of a high-specification required process.

For example, the processor 120 may not count whether a critical kill occurs when a packaged process is repeatedly executed. For example, when an "Internet program" is executed first, a "game 1 program" is executed, and then the "Internet program" is executed again, the processor 120 may ignore whether a critical kill corresponding to the re-executed "Internet program" occurs. When the "game 1 program" is also executed again, whether a critical kill corresponding to the re-executed "game 1 program" occurs may be ignored.

Referring to FIGS. 8A and 8B, the processor 120 may determine that a critical kill occurred three times while programs were executed a total of nine times. However, the programs have been repeatedly executed four times while the programs were executed nine times, and thus the processor 120 may not count the four times the programs have been repeatedly executed. According to one or more embodiments, the processor 120 may identify, based on the packaged process, that a critical kill occurred two times while the programs were executed a total of five times. The processor 120 may calculate that the termination rate of the packaged process is 40%. According to one or more embodiments, the processor 120 may determine that a memory-critical situation has occurred when the termination rate of packaged processes is about 50% or more.

A method according to various embodiments may include executing at least one process under control of a memory management module configured to manage a memory of an electronic device, identifying a rate at which the at least one process is terminated, based on a preconfigured first cycle, detecting a situation in which the identified rate exceeds a first threshold value, and performing rebooting when the detected situation continuously occurs so that a second threshold value is exceeded.

According to one or more embodiments, the first threshold value is configured based on memory capacity.

The method according to one or more embodiments may further include identifying capacity of the memory, determining whether to group the at least one process as a package, based on the identified memory capacity, and packaging the at least one process and, when the package is re-executed, prevent the number of times of execution related to the re-execution from being reflected in a rate at which the package is terminated.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
 a memory management module;
 a processor operatively connected to the memory management module; and
 a memory controlled by the memory management module and operatively connected to the processor,
 wherein the memory is configured to store instructions which, when executed, cause the processor to:
  execute at least one process,
  identify a rate at which the at least one process is terminated, based on a preconfigured first cycle,
  determine a number of times the identified rate exceeds a first threshold value, and based on a determination that the number of times the identified rate exceeds the first threshold value is greater than a second threshold value, reboot the electronic device.

2. The electronic device of claim 1, wherein the processor is further configured to:
identify a capacity of the memory, and
configure the first threshold value based on the identified capacity of the memory,
wherein a first capacity of the memory that is larger than a second capacity of the memory has a first reference value that is smaller than a second reference value associated with the second capacity.

3. The electronic device of claim 1, wherein the processor is configured to:
identify a capacity of the memory,
group the at least one process as a package based on the identified capacity of the memory, and
based on a re-execution of the package, prevent the number of times of execution related to the re-execution from being included in a termination rate of the package.

4. The electronic device of claim 3, wherein the processor is further configured to:
identify, based on the first cycle, the termination rate of the package, and
reboot the electronic device based on a determination that the identified termination rate of the package exceeds a third threshold value, and
wherein the third threshold value is about 50%.

5. The electronic device of claim 1, wherein the processor is further configured to:
identify that the memory is insufficient based on a determination that the identified rate exceeds the first threshold value,
identify, based on a determination the memory is insufficient, a priority of the at least one process allocated to the memory,
select the at least one process based on the identified priority, and
terminate the selected at least one process.

6. The electronic device of claim 1, wherein the processor is further configured to:
based on the determination that the number of times the identified rate exceeds the first threshold value exceeds the second threshold value, reboot the electronic device to initialize the memory, and
based on a determination that the number of times the identified rate exceeds the first threshold does not exceed the second threshold value, identify a rate at which the at least one process is terminated based on a second cycle.

7. The electronic device of claim 1, further comprising a display module configured to display a user interface related to the rebooting,
wherein the processor is further configured to:
display a guide through the display module based on the determination the number of times the identified rate exceeds the first threshold value exceeds the second threshold value, and
reboot the electronic device in response to a user input corresponding to the guide.

8. The electronic device of claim 1, wherein the processor is further configured to:
identify a usage pattern stored in the memory, and
reboot the electronic device based on the identified usage pattern.

9. The electronic device of claim 1, further comprising a communication module configured to communicate with a server,
wherein the processor is further configured to:
perform wireless communication with the server using the communication module,
transmit, to the server, one or more of information related to the memory, log information, and time information,
receive a reboot command from the server using the communication module, and
reboot the electronic device in response to the reboot command.

10. A method performed in an electronic device, the method comprising:
executing at least one process under control of a memory management module configured to manage a memory of the electronic device;
identifying a rate at which the at least one process is terminated based on a preconfigured first cycle;
determining a number of times the identified rate exceeds a first threshold value; and
based on a determination that the number of times the identified rate exceeds the first threshold value is greater than a second threshold value, performing a rebooting of the electronic device.

11. The method of claim 10, further comprising:
identifying a capacity of the memory of the electronic device, and
configuring a first threshold value based on the capacity of the memory,
wherein a first capacity of the memory that is larger than a second capacity of the memory has a first reference value that is smaller than a second reference value associated with the second capacity.

12. The method of claim 10, further comprising:
identifying a capacity of the memory of the electronic device;
grouping the at least one process as a package based on the identified memory capacity;
based on a re-execution of the package, preventing the number of times of execution related to the re-execution from being included in a termination rate of the package.

13. The method of claim 12, further comprising:
identifying, based on the first cycle, the termination rate of the package; and
rebooting the electronic device based on a determination the identified termination rate of the package exceeds a third threshold value.

14. The method of claim 10, further comprising:
identifying that the memory is insufficient based on a determination that the identified rate exceeds the first threshold value;
identifying, based on a determination that the memory is insufficient, a priority of the at least one process allocated to the memory;
selecting the at least one process based on the identified priority; and
terminating the selected at least one process.

15. The method of claim 10, wherein the performing of the rebooting comprises:
based on the determination the number of times the identified rate exceeds the first threshold value exceeds the second threshold value, rebooting the electronic device to initialize the memory.

16. The method of claim 15, further comprising:
based on a determination that the number of times the identified rate exceeds the first threshold does not exceed the second threshold value, identify a rate at which the at least one process is terminated based on a second cycle.

17. The method of claim 10, further comprising:
displaying a guide through a display module based on the determination the number of times the identified rate exceeds the first threshold value exceeds the second threshold value, and
rebooting the electronic device in response to a user input corresponding to the guide.

18. The method of claim 10, further comprising:
identifying a usage pattern stored in the memory; and
rebooting the electronic device based on the identified usage pattern.

19. The method of claim 18, wherein the usage pattern includes one or more of information regarding a program frequently used by a user, information regarding a program frequently used by the user, or information regarding a location of the electronic device.

20. The method of claim 10, further comprising:
performing wireless communication with a server using a communication module,
transmitting, to the server, one or more of information related to the memory, log information, and time information,
receiving a reboot command from the server using the communication module; and
rebooting the electronic device in response to the reboot command.

* * * * *